United States Patent [19]

Chung et al.

[11] Patent Number: 5,665,289
[45] Date of Patent: Sep. 9, 1997

[54] SOLID POLYMER SOLUTION BINDERS FOR SHAPING OF FINELY-DIVIDED INERT PARTICLES

[75] Inventors: Chan I. Chung, Schenectady; Miao Yong Cao, Troy, both of N.Y.

[73] Assignee: Chang I. Chung

[21] Appl. No.: 400,577

[22] Filed: Mar. 8, 1995

Related U.S. Application Data

[63] Continuation-in-part of Ser. No. 881,822, May 12, 1992, abandoned, which is a continuation-in-part of Ser. No. 520,076, May 7, 1990, abandoned.

[51] Int. Cl.$^6$ .................... C04B 38/04; C04B 38/06
[52] U.S. Cl. .................... 264/628; 264/344; 264/656; 264/670; 164/101; 419/2; 419/5; 419/36; 419/37; 419/65
[58] Field of Search .................... 264/63, 344, 60; 419/36, 37, 65, 2, 5; 164/101

[56] References Cited

U.S. PATENT DOCUMENTS

| | | | |
|---|---|---|---|
| 4,283,360 | 8/1981 | Henmi et al. | 264/63 |
| 4,604,249 | 8/1986 | Luhleich et al. | 264/63 X |
| 4,765,950 | 8/1988 | Johnson | 264/63 X |
| 5,059,388 | 10/1991 | Kihara et al. | 264/63 X |

Primary Examiner—James Derrington
Attorney, Agent, or Firm—William J. Daniel

[57] ABSTRACT

A new class of binders for binding finely divided inert inorganic molding particles when shaped into objects by known mechanical shaping techniques such as injection molding. The novel binders are solid polymer solutions containing a major fraction of a low molecular weight solid relatively non-volatile chemical as solvent in which is substantially dissolved a minor fraction of at least one high molecular weight solid polymer. The solid polymer solution binders when molten are homogeneous solutions and can be readily uniformly mixed with the usual inorganic molding particles into a readily flowable mixture which can be shaped and solidified. When solidified, the polymer and solid chemical remain a substantially homogeneous solution without appreciable phase separation. The solid chemical fraction can be eliminated from the solid object by selective solvent extraction, leaving the solidified polymer fraction essentially undisturbed as a porous matrix for the molding particles so that the shape of the object is faithfully preserved. The resultant porous body can be used as is or have the remaining polymer fraction eliminated, if desired, e.g. by thermal decomposition of the polymer, to obtain a shaped part of the inert inorganic material ready, if desired, for sintering. A coupling agent, such as a plastic or other additive, may be included to improve binder-particle adhesion.

6 Claims, 6 Drawing Sheets

A : (20 % PS + 80 .% AC) + SA Coated Iron Powder
B : (20 % PS + 80 .% DPS) + SA Coated Iron Powder
C : (20 % PS + 80 .% DPC) + SA Coated Iron Powder

SOLID POLYMER SOLUTION BINDERS FOR SHAPING OF FINELY-DIVIDED INERT PARTICLES

CROSS-REFERENCE TO RELATED APPLICATION

This application is a continuation-in-part of our prior application Ser. No. 07/881,822, filed May 12, 1992, now abandoned, which is, in turn, a continuation-in-part of our application Ser. No. 07/520,076, filed May 7, 1990, now abandoned.

FIELD OF THE INVENTION

This invention relates to the field of fabricating finely divided inorganic inert molding particles into shaped solid parts, including the powder injection molding (PIM) process, and is concerned, more particularly, with an improved temporary, removable binder for holding the molding particles as a shaped form prior to use or further processing.

BACKGROUND OF THE INVENTION

In conventional powder processing sometimes referred to as "press and sinter", metal, ceramic, intermetallic, refractory powders and the like are compacted under a very high pressure into bodies or parts having a desired shape and the compacted body is sintered in a furnace to yield the solid shaped product. An inherent problem in this process arises from the fact that the force of the applied pressure experienced by the compacted body decreases rapidly interiorly below its surface due to the friction between the powder particles. Therefore, the density of the compact varies from its surface to its center, resulting in non-uniform shrinkage of the compact upon sintering. Complex shapes are therefor difficult to faithfully reproduce by the conventional powder processing because of the non-uniform changes in shape caused by such non-uniform shrinkage during sintering.

The PIM process has become an important new technology in recent years in the processing of various kinds of molding powder into solid parts. The PIM process combines the plastics injection molding technology for forming desired shapes and the conventional powder processing for converting the molded parts into solid bodies. In the PIM process, the powder is mixed with a binder which forms the essential difference between the PIM process and the conventional powder processing. The binder is solid at room temperature but becomes fluid upon heating to its melting or fusion temperature. Therefore, the mixture behaves as a solid at room temperature but as a fluid upon heating, particularly when under molding pressure. The mixture, while in heated fluid condition, can be easily molded into desired shapes, including those of complex configuration, using plastics-type injection molding equipment instead of simple compacting of the solid powder particles. The solid molded so-called "green parts" have a uniform density throughout due to the fluid behavior of the mixture under heat and pressure. The binder is then typically removed or "debound" from the green part and the debound green part is treated, e.g. by sintering in a furnace, to obtain the final product. The principal advantage of the PIM process is the ability to mold complex parts with a uniform density. These parts, after debinding and further treatment, such as sintering, become the final products requiring little or no additional finishing. The disadvantages of the PIM process are difficult mixing and debinding operations.

The binder plays the key role and largely controls the success of the PIM process. A good binder must possess a number of required characteristics: a very low viscosity when molten for mixing with fine powder particles, reasonable mechanical properties when solidified for adequate green strength, good adhesion to the powder particle surface for easy mixing and good green strength, thermal or chemical properties necessary for easy debinding, ability to hold a given shape without distortion during molding, debinding and sintering, and absence of any significant adverse effects on the final product properties as well as those related to economic and health concerns. Such a combination of characteristics is usually obtained by combining several binder components to form a multi-component binder, such as the common wax-based binders used in combination with thermosetting polymers alone or blended with thermoplastic polymers by M. A. Strivens in U.S. Pat. No. 2,939,199 issued on Jun. 7, 1960, and with thermoplastic polymers in Canadian Patent 615,429 issued on Feb. 28, 1961, wherein the wax component is described as being removable either by vacuum distillation or by solvent extraction.

Although particle size is variable, powder particles used in the PIM process often have particle sizes in the order of microns for good processing behavior. A high powder volume fraction in the range of 40–70% by vol., usually 60–70% by vol., of the part is often desired to achieve good properties in the final products. Such a high powder volume fraction close to the maximum possible packing fraction, coupled with extremely small particle sizes, makes the tasks of mixing and debinding of the binder profoundly difficult. Mixing is accomplished by brute force, usually using a sigma-blade or banbury batch mixer running for many hours, usually at an elevated temperature. Although such mixing operations are expensive, they cause no damage to the mixture as long as the mixture is thermo-mechanically stable at the mixing conditions.

Debinding itself is not only difficult but also often results in undesirable distortion of the part shape, rendering it useless. For example, green parts made of wax-based binders can only be freed of the wax by heating above the melting point of the wax irrespective of the technique used, whether it be pyrolysis, wicking or even solvent leaching. Specifically, a wax cannot be leached away by solvent extraction unless the extraction takes place at a temperature above the melting point of the wax in question and it will be noted that in the Strivens U.S. patent identified above, the solvent extraction is said to be with boiling or running hot solvent or solvent vapor and in the Canadian patent by means of a Soxhlet extractor (wherein the solvent is at its boiling point). Waxes commonly soften in the range of about 40°–60° C.

Since the wax component therefore necessarily softens during the extraction, the green parts become soft and slump during debinding. This problem severely limits the utility of wax-based binders to only small simple parts. It is obviously essential that the binder remain rigid or otherwise be able to support the weight of the part during debinding in order to preserve its shape faithfully and avoid distortion thereof.

It has been suggested that the binder can be constituted of sublimable material and thus capable of removal by sublimation, including freeze-drying and reactive sublimation and, in principle, sublimable binders meet the above requirements. Herrmann in U.S. Pat. No. 3,330,892 utilizes as the binder for molding particles an organic vehicle that is solid at normal room temperatures, has a melting point below about 200° C., and a vapor pressure of at least 1 mm Hg at its melting or fusion temperature and normal ambient pressure of one atmosphere, such as naphthalene and camphor, and thus can be vaporized away by heating to a temperature at which it is volatile. A sublimable material, however, in practice, is subject to important drawbacks. Whether used alone as the binder or blended with a polymer fraction, the binder must unavoidably be at least at its melting or fusion temperature for mixing purposes and since few polymers have melting or fusion temperatures below the melting points of sublimable compounds, which in the Herrmann patent are in the range of about 50–130, except for camphor which melts at 175° C., the mixing/shaping temperature will normally be considerably higher. Thus, mixing and shaping, e.g. injection molding, must take place at at least the binder melting or fusion temperature and at that temperature, significant sublimation of the binder is, by definition, unavoidable. Hence, significant amounts of chemical vapor will escape during mixing and shaping and will deposit on the surfaces of the processing equipment, causing processing difficulties and molding defects. In addition, the proportion of binder to molding particles in the feedstock changes during these stages, making the production of a part of defined composition difficult unless complicated and expensive measures are taken to prevent binder vaporization by enclosing the mixing and molding equipment in a pressurized chamber, as Herrmann indeed recommends. Moreover, even if sublimation can be avoided prior to the debinding stage, measures must be taken to capture and recover the sublimation vapors, especially in view of modern environmental regulations not to mention cost considerations, as Herrmann also acknowledges. Therefore, a sublimable binder is at best an inadequate solution to the problem of providing a satisfactory binder for molding particles.

The above discussion of the problem of shape distortion during the debinding stage is equally applicable to all binder-assisted processing of molding particles by injection molding, extrusion, etc. An important contribution in the powder processing technology will be a binder system which can be easily debound from the molded or extruded or otherwise shaped parts without causing appreciable distortion of their part shapes.

Development of binders have been largely empirical as evidenced by the patent literatures. As identified above, M. A. Strivens in U.S. Pat. No. 2,939,199 teaches composite binder compositions made of wax and thermosetting resins alone or blended with thermoplastic resins. R. E. Wiech, Jr., in U.S. Pat. No. 4,197,118 issued on Apr. 8, 1980, and U.S. Pat. No. 4,415,528 issued on Nov. 15, 1983, forms binder compositions of wax and polyethylene resin. In the –118 patent, extraction of the binder by a solvent either in the vapor phase or in the liquid phase at a temperature at or preferably above the melting point of the binder is suggested while the –528 patent emphasizes special sintering conditions.

OBJECTS OF THE INVENTION

The main objective of this invention is a novel binder system for finely divided inorganic molding particles which can at least in part be debound from shaped green parts without causing any appreciable distortion of such parts.

Another objective of this invention is an easy convenient method of debinding a temporary binder from a shaped part of molding particles, while the shaped part is able to retain its shape faithfully throughout the debinding and any subsequent processing operation, such as sintering.

DESCRIPTION OF THE INVENTION

In accordance with the present invention, a low molecular weight chemical compound which is normally a crystalline solid at room temperature is selected to act when molten as a solvent for a specific high molecular weight polymer, i.e. the molten chemical and dissolved polymer are selected to exhibit mutual compatibility with one another, at elevated temperatures above the melting point of the low molecular weight compound which may also be above the melting or fusion temperature of the polymer to facilitate its dissolution. At a temperature above at least the melting point of the low molecular weight compound, the low molecular weight compound and the dissolved polymer form essentially a true solution, i.e. they co-exist as a single essentially homogeneous phase without significant phase separation of the polymer. This solution of polymer in the chemical compound when cooled below the recrystalization temperature of the chemical becomes a solid without any significant separation of a separate polymer phase. That is, the low molecular weight compound and polymer in the solid state remain essentially homogeneous and the resultant solid can thus be descriptively called a "solid polymer solution" (SPS).

A SPS is made of a major fraction of a solid crystalline low molecular weight chemical having a low melting point above room temperature and a minor fraction of at least one high molecular weight polymer which have the required relationship of mutually solubility, or compatibility, in both the molten and solid states. By virtue of that relationship, upon heating the chemical melts and dissolves the polymer to form a substantially homogeneous solution, and when cooled the solution becomes a mechanically strong homogenous solid without perceptible phase separation of the polymer A SPS offers great potential as a binder in powder metallurgy and the like. It has a very low viscosity when molten, due to the extremely low viscosity of the molten chemical solvent phase, and also a good green strength when solid due to the contribution of the polymer solute phase which is homogeneously distributed throughout the mixture on an essentially molecular level, as contrasted from the substantially discrete dispersed particles of a separate dispersed phase. After melting and mixing, the mixture of the two is at least essentially homogeneous and thus the presence of the solid chemical will not introduce any defects in the final sintered parts due to localized variations in the binder composition. The viscosity and green strength of a SPS can be easily controlled by adjusting the polymer content.

The important feature of a SPS as a binder is the ability to undergo selective debinding of the chemical solvent component from the molded part by a relatively simple technique, namely extraction, i.e. leaching, with a common solvent liquid (including water), which can be effectively carried out at a low temperature below the melting point of the chemical, leaving the polymer component intact in the shaped part to hold the molding particles in the imparted shape. Since the solid chemical is below its softening, melting or fusion temperature (these terms being interchangeable for purposes of the invention) while undergoing removal, it does not soften and slump during this stage but remains rigid until completely or essentially eliminated. Consequently, the shaped part stays rigid during debinding, retaining the desired part shape without any appreciable distortion and faithfully preserving its configuration. The polymer component remains as a finely porous matrix for the molding particles in the part after debinding of the solid chemical (the removal of which causes the pores) and serves to retain the shape of that part. The polymer component can eventually be removed, if desired, preferably by thermal debinding or pyrolysis in a furnace at high temperatures, e.g. during a preliminary stage of sintering of the molding particle part.

Because of their mutual solubility or compatibility in the solid state, the low molecular weight compound and high molecular weight polymer are mutually homogeneously distributed throughout one another in a single phase on an essentially molecular basis, as contrasted with a two-phase mixture with the polymer constituting a separate dispersed phase within a continuous phase of the compound. Hence, the removal by extraction of the solid chemical compound molecules tends to have little or no effect on the continuity of the remaining solid polymer so that the solid polymer retains its molded shape with maximum fidelity both internally and superficially.

Because the flow molecular weight chemical compound makes up the major phase, it is for convenience considered to act as the "solvent" for the high molecular weight polymer. But since the chemical and polymer when molten are mutually soluble, each in fact can act as the "solvent" for the other and the designations of "solvent" and "solute" have no substantive meaning under such circumstances.

The choice of suitable low molecular solid chemical solvents is, in principle, almost unlimited, with the obvious proviso that the selected chemical must satisfy the necessary criteria vis-a-vis a selected polymer. That is to say, that for a selected low molecular weight compound, a high molecular polymer must be identified having the required relationship, or vice versa. Generally, the solvent will be organic in nature; inorganic chemicals are not necessarily excluded but are unlikely to prove useful in practice. Similarly, the low molecular chemical as solvent will more often than not be crystalline at least in its normal state. Some of the suitable chemicals may be amorphous when "supercooled", i.e. rapidly quenched well below their solidification temperature, but will revert to their normal crystalline state when returned to room temperature. Non-crystalline materials at RT are not in principle inoperative for that reason alone but suitable examples are likely to be rare in practice.

The designation of the solvent chemical compound as being of low molecular weight is in relation to the high molecular weight of the polymer component and does not necessarily mean that it must be mono-molecular in nature although many effective solvent compounds will be mono-molecular. Some useful compounds may have a few recurring units in their structure, e.g., the so-called oligomers, and, in particular, polyethylene glycols (PEG), as are sold under the trademark "CARBOWAX", with an average molecular weight from about 1000 to about 4000–5000 have proven quite useful when associated with a high molecular weight polymer having the requisite properties, one example of which is polymethylmethacrylate (PMMA). Below about 1000 mol. wt., these glycols are viscous liquids at room temperature and do not meet the criteria for the invention. Above about 4000–5000, the melt viscosity greatly increases and at an exponential rate, complicating mixing. The polypropylene oxide analogues of PEG have not actually been checked but are predicted to perform more or less the same as PEG, although perhaps with somewhat different quantitative molecular weight limits corresponding to the limiting properties of having a normal solid state and a manageable melt viscosity from the standpoint of mixing. PEG and its PEO analogues would not be expected to be useful in association with polymers substantially reduced in hydrophility from, for instance, PMMA. For example, PEG is not an effective solvent for polystyrene or polyvinyl acetate.

Examples of mono-molecular low molecular weight compounds that have been found satisfactory in combination with, for example, polystyrene as the high molecular weight polymer are acetanilide (AC), diphenyl sulfone (DPS), diphenyl carbonate (DPC), and antipyrine (ANP). These low molecular weight compounds, however, would not necessarily be expected to be suitable with other polymers of different hydrophobicity. For instance, AC has not proven acceptable in combination with polymethylmethacrylate.

The essential criterion for the solvent chemical is mutual solubility or miscibility with the polymer when both are in the molten or fused state as well as when both are in the solid state and this requirement is most likely to be met when the chemical structure of the solid solvent and polymer solute are somewhat generally related. For example, the choice of a chemical solvent of aromatic structure is usually felicitous in terms of mutual solubility, at least for polymer solutes which likewise include aromatic structures.

In addition, the solid chemical should be relatively, i.e. substantially, non-volatile at least at a temperature equal to its melting point in order to avoid the problems mentioned above in connection with the Herrmann patent. Applying the criterion given by this patentee, the solid chemical should have a vapor pressure of less than 1 mm Hg at ambient pressure at its melting point and for present purposes preferably at the melting or fusion temperature of the polymer component as well. Parenthetically, it will be understood that the phrase "melting or fusion temperature" is intended to include a melting range or glass transition temperature range in the case of glassy or amorphous polymers and the like that do not possess any precise melting point.

The identification of effective combinations of solid chemical solvent and polymer solute can be carried out by simple screening tests involving heating selected pairs of chemical and polymer together until molten and observing whether or not a particular pair will mix together to form an essentially homogeneous solution when agitated or otherwise mixed, as necessary for the invention, or, conversely, will undergo a definite phase separation either directly in the molten state or when allowed to cool to room temperature to reach the solid state. Generally speaking, transparency is at least a rough indication of a homogeneous solution in either a molten or solid state. More precise detection of an undesirable solid polymer phase can be made by heat capacity measurement which distinctly reflects the effect of the latent heat of fusion/solidification of the polymer component and thus reveals the creation of separated solid polymer.

In addition, a separate phase of a polymer will exhibit the characteristic melting temperature or range of that polymer which will normally be distinct from the melting point of the low molecular weight compound, particular if the latter is crystalline as preferred. And the difference in melting temperatures can be differentiated with suitable known analytical instruments, such as a differential scanning calorimeter. In contrast, a true solution exhibits a melting point or range that is different from that of either the solvent or solute, as exemplified by the dissolution of common salt, i.e. sodium halide, in water which, as is well known, depresses the freezing/melting point of water by some 8°–10° F.

It will be understood that perfect or ideal homogeneity is not a prerequisite in the SPS provided there is not large scale separation. Thus, the polymer can be present as very fine particles, i.e. with micro-scale separation, so long as such micro-particles are smaller in size than the molding particles. Obviously, there is only a fine line of distinction at best between true molecular homogeneity and micro-scale homogeneity which need not be drawn here.

Any polymer satisfying the solubility requirements in relation to a given solid low molecular weight compound and otherwise useful as a molding particle binder, e.g. Sufficient coherency for adequate temporary mechanical strength, ability to undergo volatilization or combustion during any desired sintering or pre-sintering heat-treatment without adverse consequences on the remaining body of particles, etc. will be useful in this invention. Polystyrene and polymethyl methacrylate are especially suitable as are phenoxy resins, to name a few. The listing of these examples as a group is not intended to imply that all have similar solubility behavior and that all will be appropriate for association with the same low molecular weight chemical. In fact, this will rarely if ever be the case. Some compounds may be compatible with certain polymers while others may be compatible with other polymers but seldom if ever will a compound be compatible with all of the listed polymers.

It may be desirable to utilize more than one polymer, particularly where the properties of the overall binder can be modified and improved by the addition of some other polymer that is compatible with the basic polymer and with the selected low molecular weight chemical. For instance, the flexibility of a binder based on polystyrene, which has a tendency toward brittleness, can be improved by the addition of polyvinyl acetate. A block copolymer containing a substantial block of polystyrene and polyvinyl alcohol may also be useful as "modifying polymers". Oxidized polyethylene is a particularly advantageous modifying polymer for PEG in combination with PMMA, as explained more fully latter.

The solid solvent component should make up the major fraction of the SPS binder while the polymer solute is the minor fraction. The exact limits of such fractions for a particular combination will usually depend on practical considerations such as the resultant viscosity since that property increases with increasing concentration of polymer, which influences difficulty of mixing with the powder particles. The Upper limit for the minor polymer fraction will rarely if ever exceed about 40–45% by wt, and in practice will generally be lower, say around 20–30% by wt. The lower limit for the polymer is about 5%, by wt. but will usually be higher, say about 10–15% by wt. These ranges are not critical and the proper combination of the two can easily be determined by simple tests comparing various mixture based on the circumstances of a particular end use. As the polymer content increases, the green strength of the shaped part increases but, as mentioned, the viscosity of the mixture also increases and these opposite characteristics have to be balanced to fit a given need. The inclusion of a coupling agent for improving the adhesion of a solid solvent with a relatively incompatible type of particle, a viscosity-adjusting agent, a plasticizing agent, or other additives may affect these limits either upwardly or downwardly as the case may be. The amounts of these optional additives will normally be minor and are disregarded in specifying above the proportions of the solid chemical and polymer.

The relative proportions of SPS (as a whole) to the molding particles is best determined volumetrically since the particles may be of much greater density, especially when metallic. Generally, the volume of the molding particles should be as high as possible, preferably approaching maximum packing density, since only such particles remain in the final product and for the usual purposes, the experience of the art with previous binders in regard to relative proportions are applicable here. Thus, the binder by vol. might constitute as much as about 60% by volume of the binder-powder mixture, but more typically about 30–40% and perhaps a minimum of 20–25%.

The solid chemical component can be effectively extracted from the shaped green part without disturbing the essential dimensional stability or configurational fidelity of that part by dissolution in a fluid, e.g. liquid, solvent therefor at or around room temperature, preferably one having high solvent action for the solid chemical component at room temperature. Mild heating to promote or accelerate the extraction or leaching is permissible but temperatures approaching the softening temperature or range of the particular solid chemical and polymer should obviously be avoided to prevent any possibility of weakening the structural integrity of the part while the solid chemical component is being removed. Any extraction solvent that is effective to dissolve the solid chemical component without attacking the polymer or molding particles or leaving a significant residue may be used.

As already mentioned, in addition to individual polymers, use may be made of blends of two or more polymers which are compatible with one another and have substantial solubility in the solid chemical. The same holds true, in reverse, for mixtures of solid chemicals. Conceivably, one or even more polymeric components of a polymer blend could be soluble in the extraction solvent provided that at least one polymer component was insoluble and present in sufficient amount to bind the molding particles together.

After removal of the solid chemical, the polymer component remains as a finely porous matrix for the molding particles that exhibits a desirable uniformity and structured coherency throughout due to the essential initial homogeneity of the solid chemical and polymer components in the SPS. The presence of such pores is an advantage for any subsequent debinding or elimination of the polymer component or, in some cases, for the impregnation of the extracted and porous solid part with some other material, e.g. a low melting metal or possibly a different polymer such as a thermosetting polymer. Debinding of the polymer fraction is typically achieved by a heat treatment to decompose or combust the polymer and the existence of pores caused by the escape of the solid chemical not only facilitates rapid heat transfer within the interior of the part but the free escape of gaseous decomposition products without disturbing the part shape. The polymer can thus burn rapidly and escape easily without problems.

Whether the polymer component is debound from the extracted green part depends upon the circumstances. Because of the aforementioned uniformity, homogeneity, and structural integrity, the extracted part may be useful directly without removal of the polymer component. In the great majority of cases, the polymer will also be removed. Similarly, assuming that the polymer is removed, the remaining part need not necessarily be subjected to any sintering operation but could again be impregnated.

As is known in the art, a wide variety of inorganic molding particles are useful for molding shaped parts and, in principle, any of these can serve the needs of the present invention. In this connection, the adjective "molding" is not meant to imply that the shaping of the part must be done by a true molding operation but is used merely to identify a general category of known materials. Ceramics and metals, both light and heavy, and metal alloys are perhaps most common but so-called cermets, intermetallics, metallic oxides and carbides, refractories in general and so on are available as well as carbon and graphite. Similarly, the particle shape is subject to wide variation, including spherical, angular, irregular, acicular or needle-like or fibrous, e.g. whisker-like, dendritic and so on are all candidates for the present invention. Obviously, some shapes have peculiar advantages for certain purposes, as the art is fully cognizant and the experience of the art is applicable here. For elongated articles expected to withstand substantial bending stress, elongated particles, e.g. whiskers or short fibers, are the best selection while for articles that are ultimately sintered, the particles should obviously be adapted to undergo sintering upon heating to an appropriate temperature suited to the particular material of the particles. Under the contemplated processing conditions, the particles of the invention are inert and do not undergo decomposition or other reaction during the various stages of the process. This does not mean, of course, that the particles are inert under all conditions.

EXAMPLES OF THE INVENTION

An example of a preferred SPS binder is polystyrene (PS) dissolved in acetanilide (AC). Other examples include PS dissolved in diphenyl sulfone (DPS), diphenyl carbonate (DPC), and antipyrine (ANP). Several (AC+PS) binders with varying PS content from 5 to 30% to the total weight of PS and AC were made by mixing AC and PS at 150° C. for about 3 hours until PS completely dissolved in AC, and were tested as binders for a carbonyl iron powder. Stearic acid (SA) was coated on the powder as a coupling agent to promote adhesion between the powder and the binder. 10 wt. % SA to the (AC+PC) binder weight was used. A commercial PS with a weight average molecular weight of about 312,000 and the glass transition temperature of 105° C. was used. The AC sample had 97% purity with its melting point at 115° C. The reagent grade SA sample had the melting point at 75° C. The carbonyl iron powder was in the form of spherical particles with a nominal diameter of 5 micron. The powder loading was 62 vol. % or 93 wt. % in all mixtures.

The (AC+PS) binders were mechanically mixed uniformly with the SA coated iron powder using a simple impeller-type mixer at about 130° C. The mixtures were molded into rectangular bars of 12.7 mm wide by 6.35 mm thick by 50.8 mm long using a small, manual injection molder at 130° C. Evaluation of the (AC+PS) binders and their mixtures by measuring viscosity and bending strength of the molded bars showed that 20% PS content in the binder gave the optimum properties. A complete study of mixing, molding, debinding and sintering was made using the (80% AC+20% PS) binder. The molded bars were debound by leaching out AC with ethanol at RT, and the debound bars were sintered at the heating rate of 10° C. per min. up to about 1200° C. to produce perfectly shaped bars without any distortion. Addition of 5% peanut oil as a plasticizing agent into the binder improved the molding characteristics of the mixture. In order to reduce the brittleness of the binder, 10% polyethylene vinyl acetate (EVA)+10% PS was also used as the polymer component instead of 20% PS. EVA is soft and ductile, while PS is hard and brittle. The EVA sample was a commercial polymer with 27.5% by wt. vinyl acetate content. The (80% AC+20% PS) binder was successfully used with other powders including stainless steel, alumina and silicon carbide.

DPC, DPS, and ANP as solid solvents for PS when substituted for AC, also tested successfully with the carbonyl iron powder in other complete studies. ANP is water soluble, and thus it could be debound using water.

The viscosities of several examples of SPS binders were measured using a concentric cylinder rotational viscometer, while those of the mixtures with powder were measured using a capillary rheometer. It is noted that the SPS binders alone had too low viscosities to be measured by a capillary rheometer. The capillary had 0.127 cm (0.05 in) diameter by 5.08 cm (2 in) length with 90 degree entry angle.

For a controlled debinding study, circular disks of about 1 cm diameter and 0.8 cm thickness Were molded from the mixtures and the disks were immersed in an appropriate solvent for various durations to leach out the chemical component. Ethanol at 20° C. and also at 50° C. was used for AC. After leaching out AC, the disks were dried in a vacuum oven at 70° C. for about 1 day and the weights were measured to determine the extent of debound AC. Methanol, acetonitrile and their mixtures at room temperature were used to leach out DPS and DPC. Water was used to leach out ANP.

The thermal debinding characteristics of the individual components of the binders, the SPS binders themselves and their mixtures with powder were studied using a thermogravimetric analyzer (TGA) under nitrogen purge gas at 20° C./min heating rate. The bending strength of the molded bars at RT, which is treated as the green strength in this study, i.e. before sintering, was measured according to a three point bending method using a MTS tensile tester. The support roll diameter was 3.175 mm, the span length was 31.75 mm, and the cross head speed was 1.5 mm/min.

Figure 1:
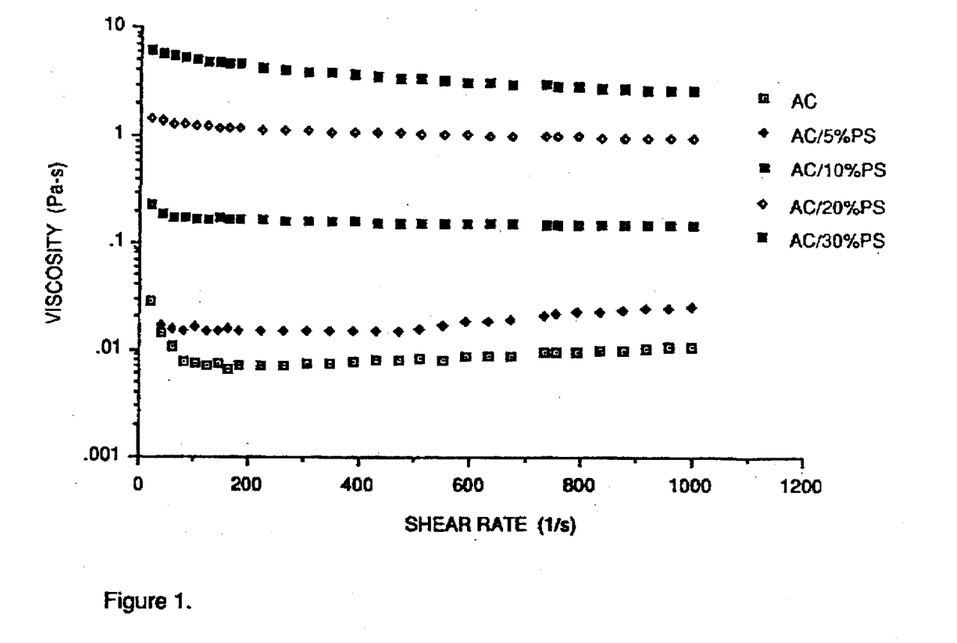
FIG. 1 depicts Viscosity of the (Acetanilide plus Polystyrene) Binders at 130° C. as a Function of Shear Rate at Five Levels of Polystyrene Content (0, 5, 10, 20, and 30% to the Weight of Binder).
Figure 2:
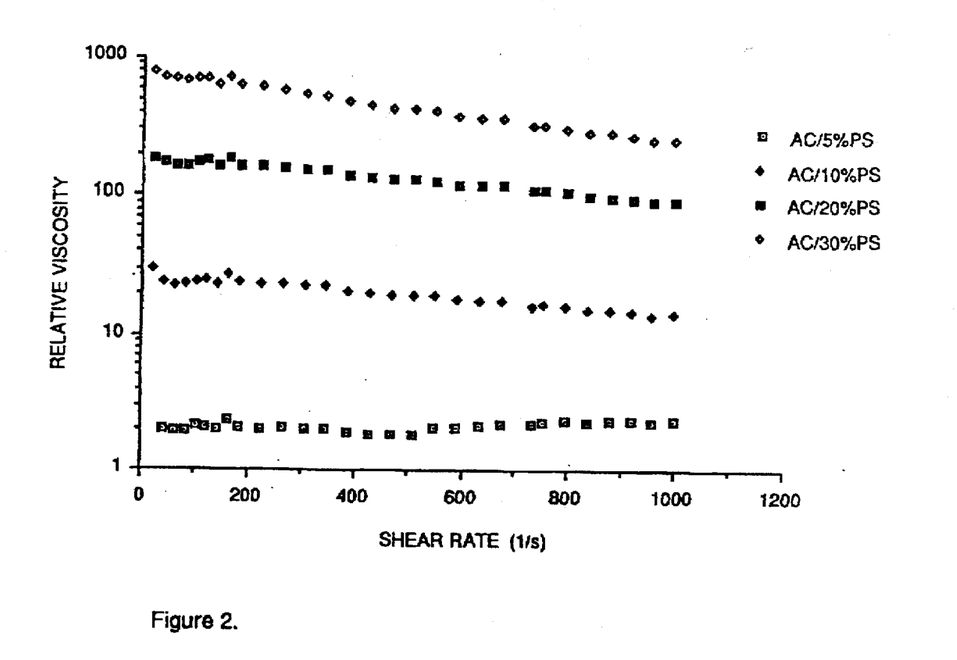
FIG. 2 depicts Relative Viscosity of the (Acetanilide plus Polystyrene) Binders at 130° C.
Figure 3:
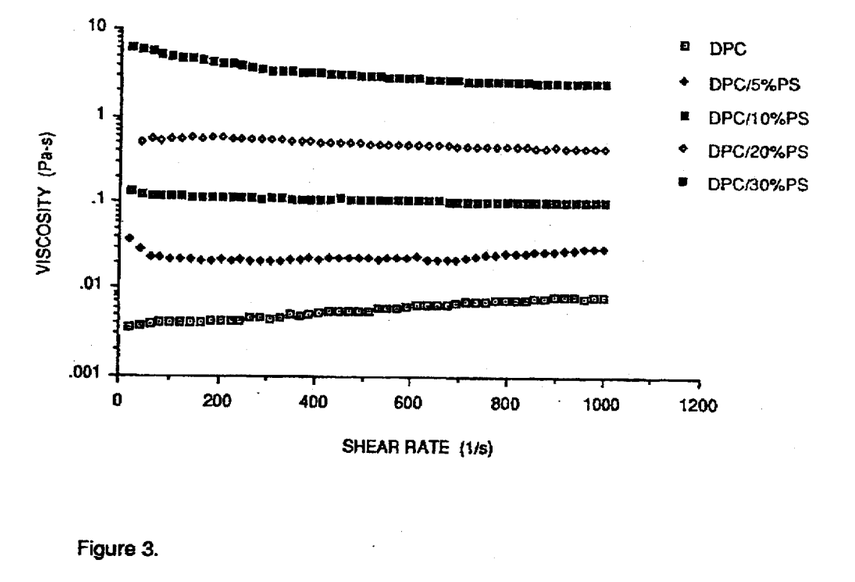
FIG. 3 depicts Viscosity of the (Diphenyl Carbonate plus Polystyrene) Binders at 130° C. as a Function of Shear Rate at Five Levels of Polystyrene Content (0, 5, 10, 20, and 30% to the Weight of Binder).
Figure 4:
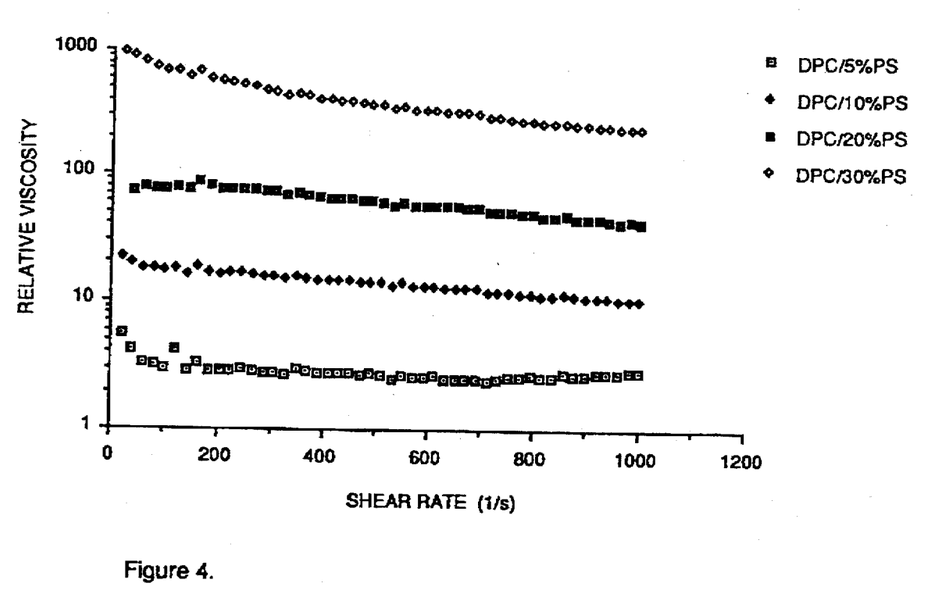
FIG. 4 depicts Relative Viscosity of the (Diphenyl Carbonate plus Polystyrene) Binders at 130° C.
Figure 5:
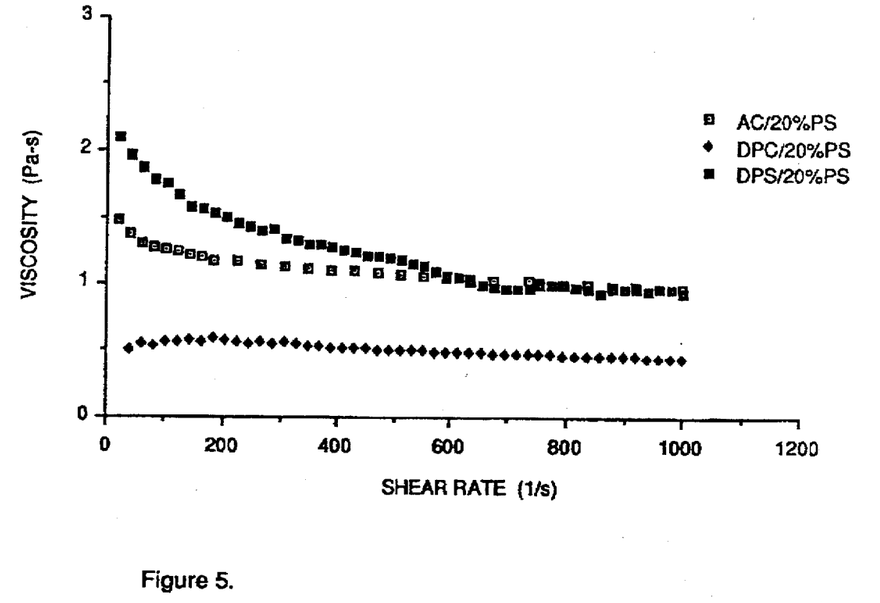
FIG. 5 depicts Viscosity of Three Different Solid Polymer Solution Binders at 130° C.

The viscosities of the (AC+PS) binders measured at 130 C. are shown in FIG. 1 as a function of shear rate at five levels of PS content (0, 5, 10, 20 and 30% by weight in the binder). The relative viscosities of the (AC+PS) SPS binders calculated from FIG. 1 are shown in FIG. 2. Relative viscosity is defined as the ratio of the solution viscosity to the solvent viscosity. The corresponding results obtained for the (DPC+PS) binders are shown in FIGS. 3 and 4. The viscosities of these SPS binders increase as the polymer content increases as would be expected of polymer solutions. These SPS binders exhibit Newtonian behavior at low polymer contents but pseudo-plastic behavior at high polymer contents above 10%. FIG. 5 compares the viscosities of three different SPS binders, (AC+PS), (DPC+PS) and (DPS+PS), all with a constant PS content of 20% at 130° C. The viscosity of a particular polymer solution depends on the interaction between the solvent and the polymer as well as the solvent viscosity and the polymer concentration. DPS and AC appear to be better solvents with greater solvating power for PS than DPC.

Figure 6:
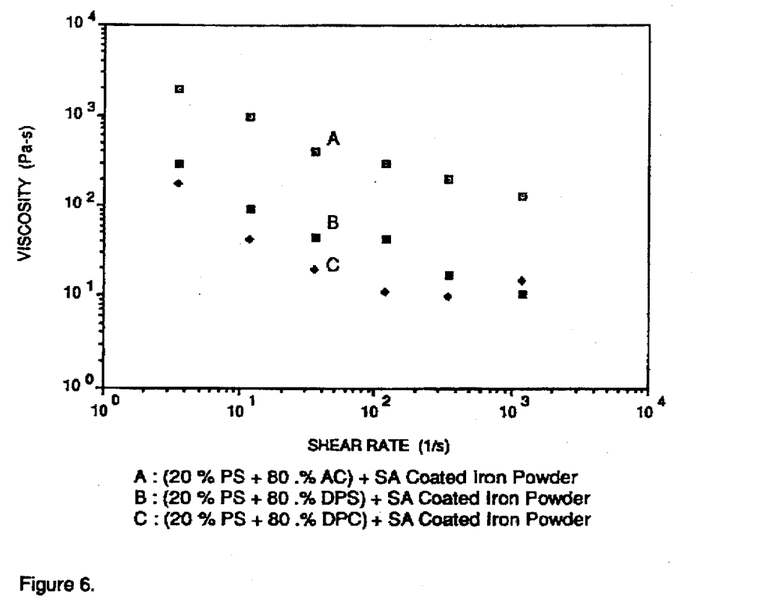
FIG. 6 depicts Viscosity of Three Mixtures of Iron Powder with Acetanilide/Polystyrene, Diphenyl Sufone/Polystyrene, and Diphenyl Carbonate/Polystyrene Binders at 130° C.

Although the (AC+PS) binder with 20% PS had a low viscosity comparable to the common wax based binders, it was difficult to mix with the powder and the resultant mixture had a high viscosity. Such unexpected behavior is probably attributable to poor adhesion of AC on iron surface. Addition of SA indeed reduced the mixture viscosity to a reasonable level. However, the effect of SA as a coupling agent was found to greatly depend on the method of adding SA into the mixture. SA was most effective when it was coated on the powder in solution. Mixing SA in the binder together with other binder components was ineffective. In order to simplify the coating operation, SA was directly mixed into the heated powder to coat the powder, and then the coated powder was mixed with the SPS binder to obtain the mixture. Three mixtures with a constant powder loading of 62 vol. % were made using the three different SPS binders shown in FIG. 5. The viscosities of these three mixtures at 130 C. are shown in FIG. 6. The (DPC+PS) binder gives the lowest binder and mixture viscosities. The (DPS+PS) binder and the (AC+PS) binder have a similar viscosity, and they also give a similar mixture viscosity. The mixture viscosity can be predicted by a simple relationship as a function of the binder viscosity and the powder volume fraction.

Figure 7:
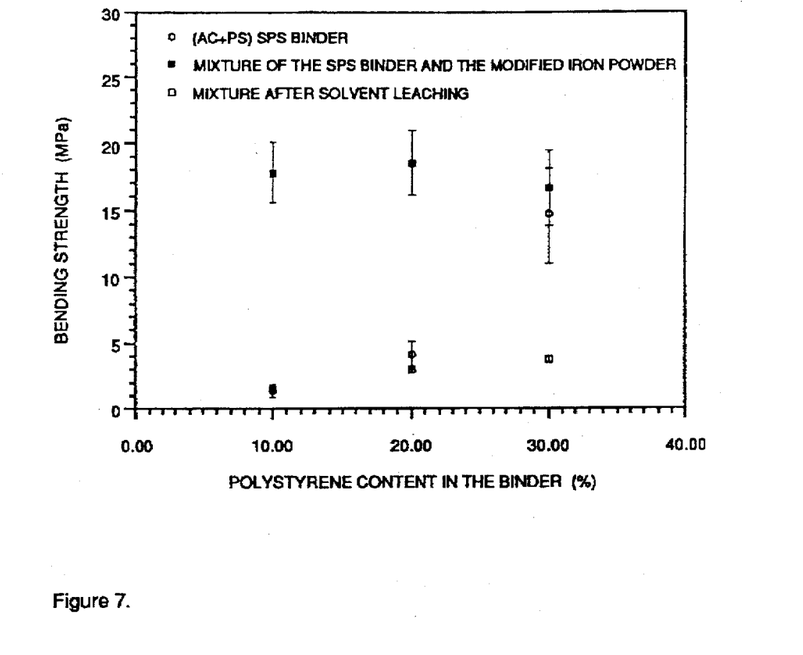
FIG. 7 shows Bending Strength of the (Acetanilide plus Polystyrene) Binder, and the Mixture with Modified Iron Powder.
Figure 8:
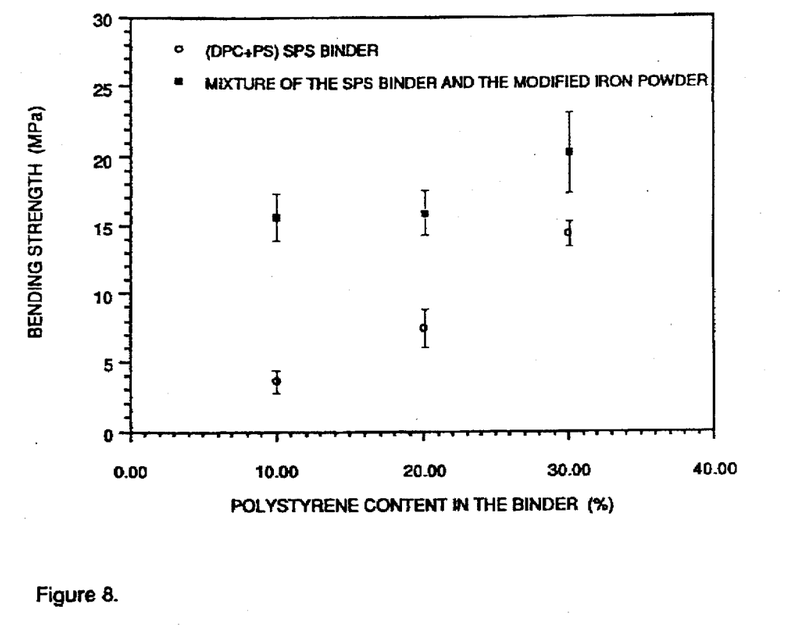
FIG. 8 shows Bending Strength of the (Diphenyl Carbonate plus Polystyrene) Binder, and the Mixture with Modified Iron Powder.

FIG. 7 shows the bending strength of the (AC+PS) binder, and the mixture before and after debinding of the solid solvent component at three levels of PS content. The corresponding results for the (DPC+PS) binder are shown in FIG. 8. The average values measured for about 8 samples are shown together with the standard deviations. The large amount of scatter in the data, especially with the mixtures, should be considered in the analysis of the results. The bending strengths of the SPS binders and the mixtures after debinding increase with increasing PS content as expected. However, the bending strengths of the mixtures before solvent debinding appear to be generally insensitive to PS content.

Figure 9:
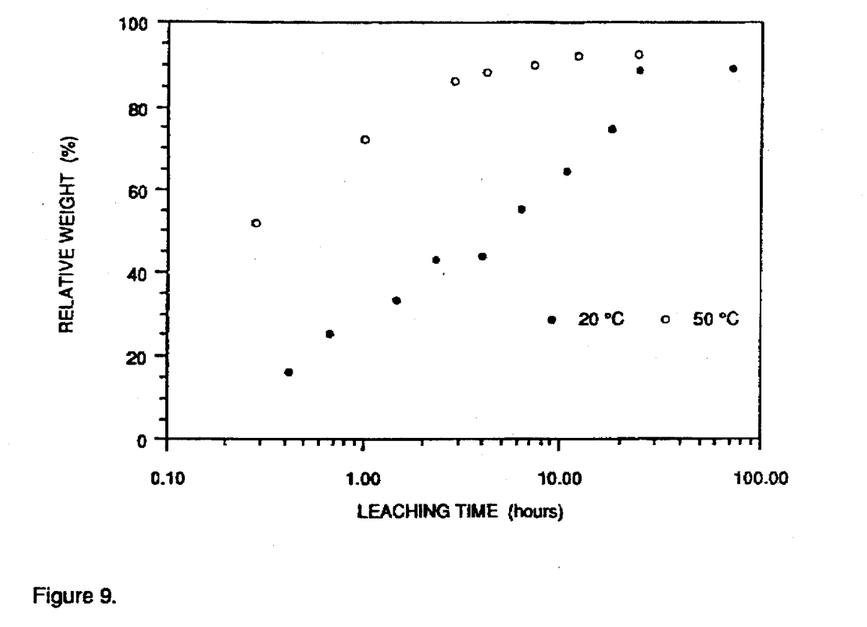
FIG. 9 shows Time Required to Leach Acetanilide From the Molded Parts (1 Cm D.×0.8 cm H.) in Ethanol at 20° and 50° C.

The results of the solvent debinding study for the disks molded of the mixture containing (80% AC+20% PS) binder immersed in ethanol are presented in FIG. 9. AC could be easily leached out of the disks using ethanol in a relatively short time without any distortion of the disks. It took only about two hours to leach out most of AC using ethanol at 50° C. The molded parts containing (80% ANP+20% PS) could be easily debound in water without any distortion of the part shape.

Figure 10:
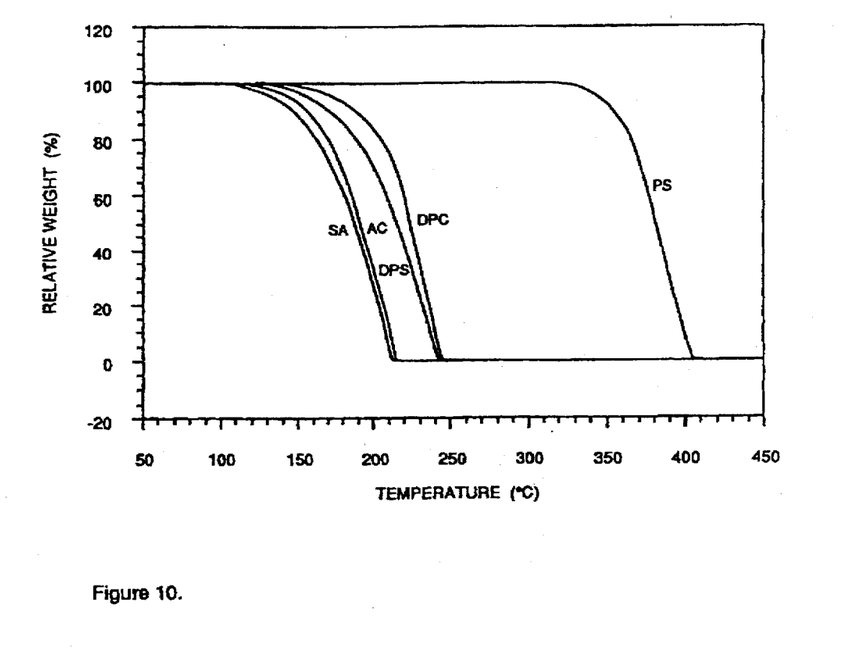
FIG. 10 shows TGA Curves of Chemicals and Polystyrene from 50° C. to 450° C. at Heating Rate of 20° C./min. Under Nitrogen Purge Gas.
Figure 11:
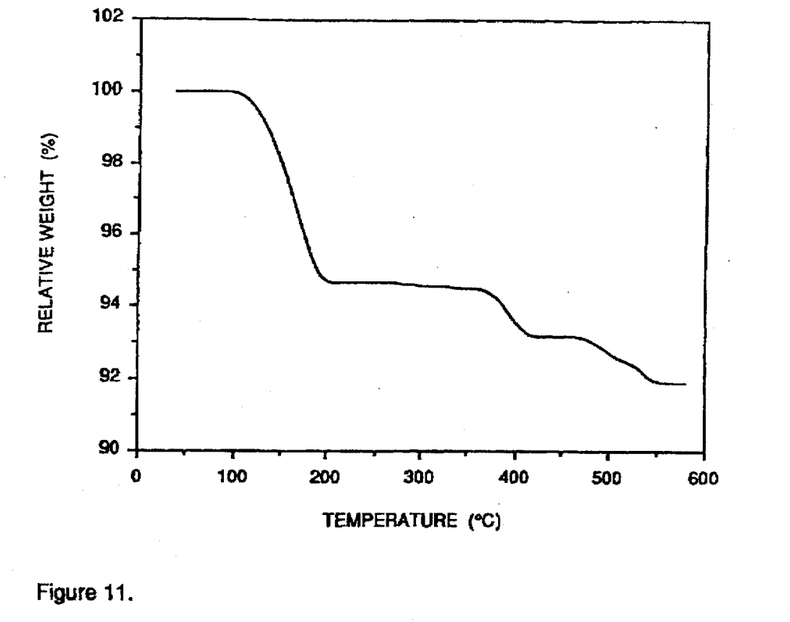
FIG. 11 shows TGA Curves of Mixture of SA Coated Iron Powder with the (Acetanilide plus Polystyrene) Binder Before Solvent Leaching at Heating Rate of 20° C./min. Under Nitrogen Purge Gas.
Figure 12:
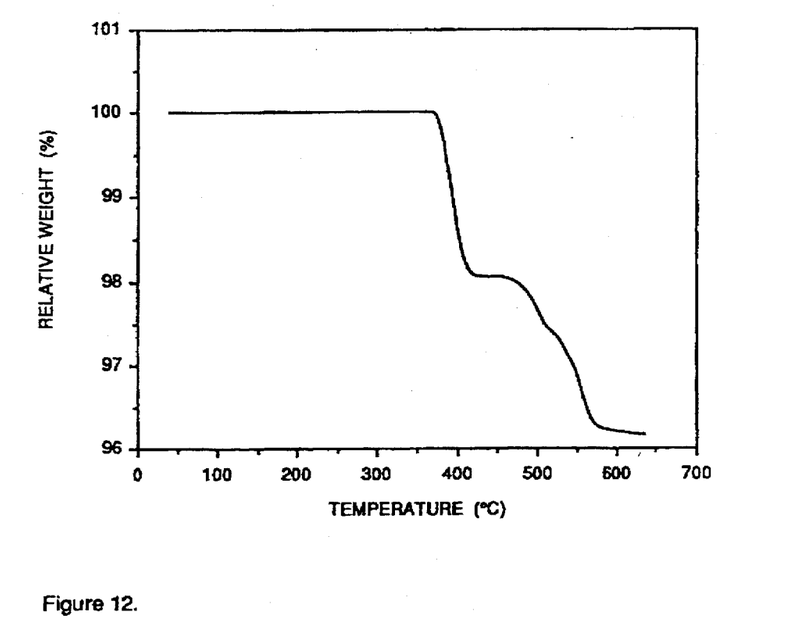
FIG. 12 shows TGA Curves of Mixture of SA Coated Iron Powder with the (Acetanilide plus Polystyrene) Binder After Solvent Leaching at Heating Rate of 20° C./min. Under Nitrogen Purge Gas.

The TGA curves of all binder components except ANP; (PS, AC, SA, DPC, DPS), are shown in FIG. 10. It is seen that all components undergo complete pyrolysis without leaving any residue. ANP also gives complete pyrolysis. The TGA curves of the mixture made of (80% AC+20% PS) binder, before and after leaching out AC in ethanol, are shown in FIGS. 11 and 12, respectively. Comparison of these figures clearly shows that AC was removed by ethanol but PS was left in the mixture. Referring to FIG. 12, the PS fraction of the binder left in the mixture after solvent debinding can be removed in a furnace by pyrolysis at 370°–400° C. The weight loss of about 1.5% of the mixture around 500° C. was caused by the carbon content and other probable impurities in the iron powder.

Additional successful tests have been carried out utilizing as the solid solvent or low molecular weight chemical polyethylene glycol (mol. wt.=about 3500) with each of commercial polymethyl methacrylate, and phenoxy resins obtained by the condensation of bisphenol and epichlorhydrin in a commercial grade with a mol. wt. of about 10,000–17,000, respectively as the polymer fraction, in which the glycol was present in the amount of about 70–80% and the polymer in the amount of about 20–30% by wt. Other polyethylene glycols which are normally crystalline solids at room temperature, 1. e. having a molecular weight down to about 1000, are equally suitable in combination with these polymers. PEG is not compatible with polystyrene at least in the absence of some special coupling agent if such can be identified and the same is expected to be true of the other glycols mentioned. PEG and the other glycols can be readily debound by extraction with water at temperatures below their melting temperatures, i.e. when solid.

Commercial oxidized polyethylene (OP) is an advantageous modifying polymer for PEG in combination with PMMA. PEG has a strong hydrophility which can result under some circumstances in a rapid take-up of water (as the extraction solvent) during debinding and can result in undesirable swelling of the shaped part. The addition of a small amount of OP reduces the rapid take-up of water by the PEG and eliminates this problem.

Some modifications in the invention have been suggested above; others will naturally occur to those skilled in the art. Hence, the invention is not limited to the particular examples but only as required by the language of the claims.

What is claimed is:

1. A method of forming shaped parts from finely divided inert molding particles which comprises the steps of generally uniformly mixing said molding particles with a binder which comprises a minor fraction of at least one high molecular weight polymer and a major fraction of a low molecular weight chemical which is a crystalline solid at room temperature to form a mixture thereof, said mixing being carried out at a temperature at which at least said chemical of said binder is in a molten state, said polymer having a melting or fusion temperature at least as high as said chemical and being essentially soluble in said solid chemical when at least said chemical is in the molten state to form an essentially homogeneous solution and when such solution is cooled from such state below the melting temperature of said chemical solidifying without significant phase separation into an essentially homogeneous solid solution, said chemical being substantially non-volatile at its melting temperature and being soluble at a temperature below its melting temperature in a liquid solvent in which at least one said polymer is essentially insoluble; shaping said mixture while said binder remains in a molten state into a shaped part and allowing said binder to cool to below the of said part; and selectively and non-destructively essentially removing said low molecular weight chemical fraction of said binder from said part while at least one said polymer remains and creates a porous solid matrix holding said molding particles in said part shape by extracting at least substantially all of the solid chemical selectively of said polymer in a liquid solvent in which the chemical is soluble and said polymer is insoluble, said extraction being carried out at a temperature below the melting temperature of said solid chemical, whereby the shaped part remains rigid during the extraction and essentially faithfully retains its initial shape.

2. The method of claim 1 wherein the molding particles are adapted to undergo sintering at high temperature and including the step of subjecting the part after the chemical fraction has been essentially removed to a high temperature thermal treatment to remove initially said polymer fraction by thermal decomposition and then to sinter said molding particles into a rigid part of a shape corresponding essentially to the initial shape imparted to said mixture.

3. The method of claim 2 wherein the part after said low molecular weight chemical fraction has been essentially removed, is subjected to pyrolysis at a temperature sufficient to essentially decompose said polymer and remove the polymer therefrom while the shaped part retains its shape.

4. The method of claim 3 wherein after said pyrolysis to essentially decompose and remove the polymer from said part, the part is subjected to impregnation of a liquid form of a normally solid material to form a coherent body of substantial structural strength.

5. The method of claim 1 wherein said mixture of binder and molding particles is shaped by dynamic molding under sufficient pressure and heat to cause the mixture to undergo fluid flow to form said shaped part.

6. The method of claim 1 wherein said mixing of said binder and said molding particles is carried out at a temperature at which said polymer is also molten and dissolves in said molten chemical to form said essentially homogeneous solution.

* * * * *